June 10, 1958   A. L. LEWIS   2,837,753
SEADROME LIGHT SUPPORT
Filed Feb. 14, 1957
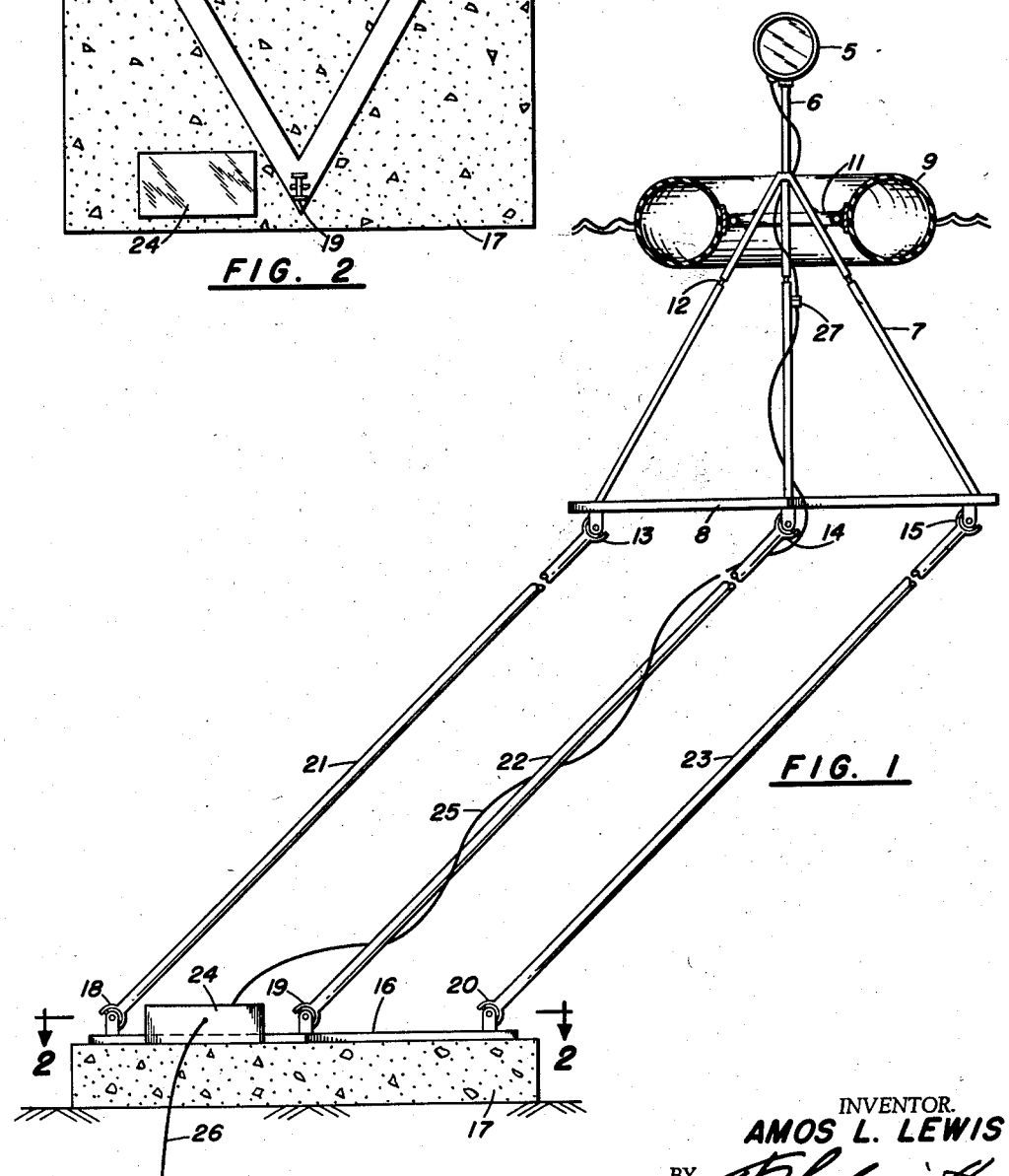
INVENTOR.
AMOS L. LEWIS
BY
ATTORNEYS

United States Patent Office 2,837,753
Patented June 10, 1958

2,837,753

SEADROME LIGHT SUPPORT

Amos L. Lewis, Vienna, Va., assignor to the United States of America as represented by the Secretary of the Navy Application February 14, 1957, Serial No. 640,298

4 Claims. (Cl. 9—8.3)

(Granted under Title 35, U. S. Code (1952), sec. 266)

This invention described herein may be manufactured and used by or for the Government of the United States of America for governmental purposes without the payment of any royalties thereon or therefor.

This invention relates to a seadrome light support and more particularly to a seadrome light support having universal joint connections arranged in a triangular figure which provide a variable height, variable locus, and constant orientation support for buoy mounted lights.

In the past, buoy mounted lights were held in approximate location by flexible mooring lines. Also a spar buoy or piles have at times been used to support the light. There are definite disadvantages in the use of these old supports. The mooring lines provide no means of maintaining either vertical or horizontal orientation. Spar buoys provide fair horizontal orientation but poor vertical orientation and extremely variable distance in height of the light above the water level where the tide variations are considerable. Piles are considered hazardous to aircraft or boats in many locations and permit no allowance in variance of height due to tides.

In the present invention a seadrome light support assembly is provided that is free to move up and down and in a circular locus above the base member while maintaining a constant orientation of a highly directional type of signal light. This type of support assembly overcomes the disadvantages noted above in the use of known buoy mounted light supports. It is desirable that a light for outlining seaplane landing areas be supported at a substantially fixed distance above the water level on a relatively light weight rubber or similar buoy so that the hazard to surface traffic and seaplanes will be reduced to a minimum. The buoy must rise and fall with wave and tide and move to one side or submerge when run down by surface craft, or seaplanes. Seadrome signal lights to be efficient require optical systems that direct emitted light in narrow highly directional beams, hence the light must be held from nodding, i. e. rotating about a horizontal axis transverse to the beam, and be restrained from turning about its vertical axis when the light is moved up and down and throughout a circular or more accurately a partially spherical locus, having the fixed base as a center. The type of signal lights which emit a highly directional narrow type of beam are used to outline runways for aircraft. Generally, this type of signal light emits a beam of light having a vertical angle of divergence of three to seven degrees and a horizontal angle of divergence of seven to twelve degrees. Therefore it is obvious that the signal light must remain in a fixed orientation to emit an oriented beam of light in order that the pilot of an aircraft can approach the landing area at the proper landing angle. It is relatively easy to provide this type of signal light to the ordinary land runways; but the signal lights used to outline a runway for seaplanes encounters all of the difficulties outlined above. If the signal light used for seaplane runways can rotate about a horizontal axis, the vertical angle of the beam will be shifted and therefore provide a false landing angle for the aircraft pilot. The angles of the emitted light beam can be changed to correspond to the requirements of a particular size runway.

An object of the present invention is the provision of a seadrome light support which will maintain a constant orientation of a highly directional type of signal light.

Another object is to provide a seadrome light support which has a minimum number of parts and is relatively cheap to manufacture and maintain.

A further object of the present invention is the provision of a seadrome light support that reduces the hazard to surface traffic to a minimum.

Still another object is to provide a seadrome light support that rises and falls with the waves and tides and yet prevents the light from nodding.

Other objects and many of the attendant advantages of this invention will be readily appreciated as the same becomes better understood by reference to the following detailed description when considered in connection with the accompanying drawings wherein:

Fig. 1 shows an elevational view, partly in section, of a preferred embodiment of the invention.

Fig. 2 shows a section of the device taken on the line 2—2 of Fig. 1.

Referring now to the drawings, wherein like reference characters designate like or corresponding parts throughout the several views, there is shown in Fig. 1 a seadrome light 5 mounted on a standard 6 which is supported by a tripod 7. The lower ends of the tripod are fixedly mounted to a platform 8. The platform 8 is preferably made of a buoyant material which would enable the platform to float. A circular buoy 9 is secured to the upper ends of the tripod 7 by means of a ring 11.

The legs of the tripod 7 are provided with weakened sections 12 which are below the connecting point of ring 11 with the tripod, to allow for the upper half of the tripod 7 to separate therefrom in case of a severe blow by a surface craft.

Universal joints 13, 14, 15, are provided on the under surface of the platform 8 and arranged in a triangular relationship. A fixed platform 16 is securely mounted to a concrete block 17, which is anchored to the bottom of the sea. Universal joints 18, 19, 20, are provided on the upper surface of platform 16 and are also arranged in a triangular relationship. Connecting rods 21, 22, and 23, are connected between universal joints 13 and 18, 14 and 19, 15 and 20, respectively.

A transformer 24 is mounted on the platform 16 and is connected to the signal light 5 by means of cables 25. A high voltage line 26 furnishes the required power to the transformer 24. A releasable waterproof connection 27, such as a plug and socket, is provided in the cable 25 to enable the cable 25 to be severed when and if the top of the tripod 7 separates along the weakened sections 12.

It should be understood that common substitutes such as ball and socket joints or flexible couplings may be substituted for the universal joints 13, 14, 15, 18, 19, and 20.

It is readily seen that the seadrome light 5 normally could be in a position similar to that shown in Fig. 1, but due to the universal joint connections arranged in a triangular relationship the light is free to move up and down and in a circular locus above the base member 16 while maintaining a constant orientation of the highly directional signal light 5.

The minimum number of connecting rods has been found to be three because in using one or two connecting rods a horizontal axis would exist which would enable the platform 8 to rock; however, a greater number of connecting rods could be used.

Obviously many modifications and variations of the present invention are possible in the light of the above teachings. It is therefore to be understood that within the scope of the appended claims the invention may be practiced otherwise than as specifically described.

What is claimed is:

1. A seadrome light support for outlining a seaplane landing area comprising a light, means for supporting said light, a buoy attached to said means, at least three universal joints fixed to said means and arranged in a triangular relationship, a platform anchored to the bottom of the sea, at least three universal joints fixed to said platform and arranged in a triangular relationship, and rods connecting respective universal joints on said means and platform whereby the light is free to move up and down and in a circular locus above the platform while maintaining a constant orientation for the light.

2. A seadrome light support for outling a seaplane landing area comprising a light for emitting narrow highly directional beams of light, means for supporting said light, a buoy attached to said means, weakened sections provided to said supporting means below the attaching point of said buoy, at least three universal joints fixed to said supporting means and arranged in a triangular relationship, a platform anchored to the bottom of the sea, at least three universal joints fixed to said platform and arranged in a triangular relationship, rods connecting respective universal joints on said supporting means and platform whereby the light is free to move up and down and in a circular locus above the platform while maintaining a constant orientation for the light.

3. A seadrome light support for outlining a seaplane landing area comprising a light, a first platform, means supporting said light from the upper side of said platform, a buoy attached to said means, at least three universal joints fixed to the under side of said platform and arranged in a triangular relationship, a second platform anchored to the bottom of the sea, at least three universal joints fixed to said second platform and arranged in a triangular relationship, and rods connecting respective universal joints on said first and second platforms, whereby the light is free to move up and down and in a circular locus above the platform while maintaining a constant orientation for the light.

4. A seadrome light support for outlining a seaplane landing area comprising a light, a first platform, means supporting said light from the upper side of said platform, a buoy attached to said means, weakened sections provided in said supporting means below the attaching point of said buoy, at least three universal joints fixed to the under side of said platform and arranged in a triangular relationship, a second platform anchored to the bottom of the sea, at least three universal joints fixed to said second platform and arranged in a triangular relationship, and rods connecting respective universal joints on said first and second platforms, whereby the light is free to move up and down and in a circular locus above the platform while maintaining a constant orientation for the light.

References Cited in the file of this patent

UNITED STATES PATENTS

| | | |
|---|---|---|
| 1,273,869 | Joy | July 30, 1918 |
| 2,404,243 | Moynihan | July 16, 1946 |